July 17, 1951  T. HINDMARCH  2,560,865
REVERSING GEAR

Filed Oct. 9, 1945  2 Sheets-Sheet 1

Inventor
T. Hindmarch

July 17, 1951     T. HINDMARCH     2,560,865
REVERSING GEAR

Filed Oct. 9, 1945                                 2 Sheets-Sheet 2

Inventor
T. Hindmarch
By Glascock Downing Kuhla
Atty's

Patented July 17, 1951

2,560,865

UNITED STATES PATENT OFFICE 2,560,865

REVERSING GEAR

Thomas Hindmarch, London, England

Application October 9, 1945, Serial No. 621,280
In Great Britain October 12, 1944

4 Claims. (Cl. 74—379)

The present invention relates to reversing gears and more particularly to such gears embodied with a marine propulsion system.

The invention specifically relates to a compact reverse gearing arrangement of improved construction occupying a minimum of space and thereby providing for ease of installation where space factors are of considerable importance.

Accordingly it is an object of the present invention to provide a compact reverse gearing arrangement embodying a common bevel gear drive constantly rotatable and selectively engageable with a driven shaft to rotate the same in opposite directions to thereby eliminate the standard installation which includes separate gear sets for forward and reverse drives necessitating spreading of the transmission and disposition of the shafts to accommodate the moving components.

It is an additional object to provide in such a reversing gear an arrangement including at least one input shaft, at least one driving shaft having a pinion thereon, coupling means between the input and driving shafts, a gear meshing with the pinion and freely mounted on the shaft to be driven, coupling means to couple this latter gear to the driven shaft to effect drive in one direction, a first bevel gear rotating with the last named gear, at least one bevel pinion fixedly supported and constantly meshing with said first bevel gear, a second bevel gear freely mounted on the driven shaft and constantly meshing with the bevel pinion and coupling means for selectively coupling the second mentioned bevel gear to the driven shaft to effect a reverse drive when the first mentioned gear is free relative to the driven shaft.

It is an additional and more specific object to provide such a compact reverse gear arrangement in which plural input shafts are provided respectively associated through clutch means with plural driving shafts to effect rotation of the gear freely mounted on the driven shaft and in which plural clutch means are disposed in parallel to couple the last named gear to the driven shaft in one direction of drive and single clutch means are provided for coupling the second bevel gear to the driven shaft in a reverse direction of drive.

It is a further and more specific object to provide in such an arrangement fluid operated clutch means as constituting the various couplings.

Figure 1:
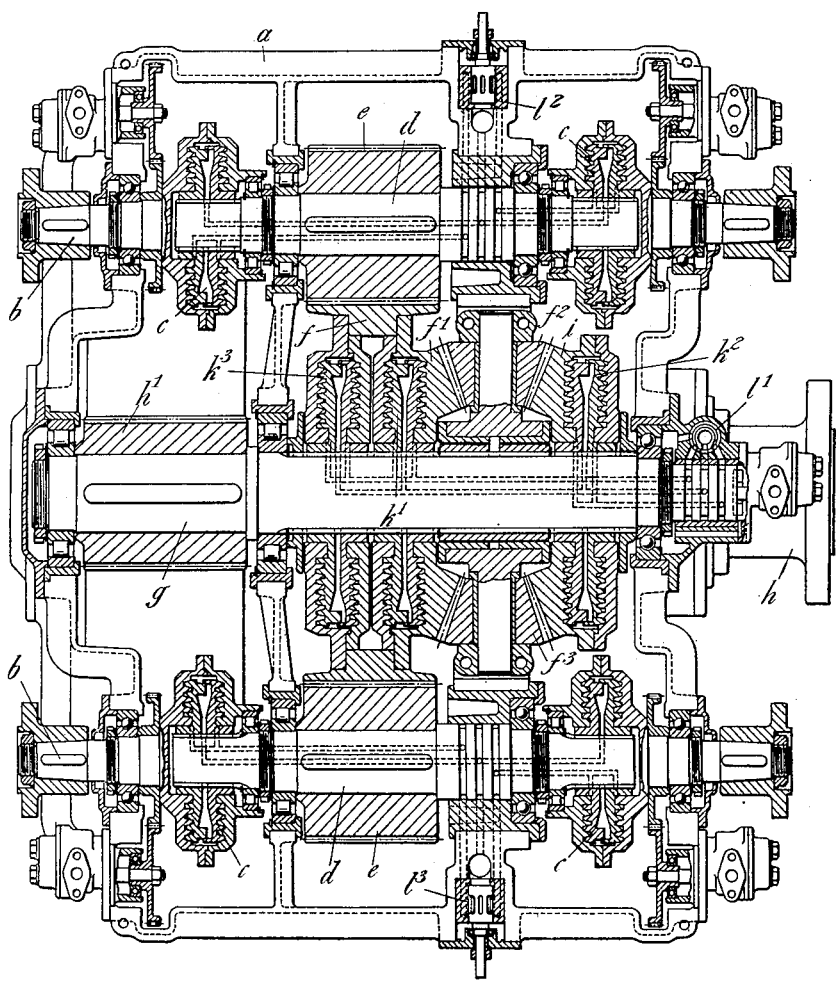
Figure 2:
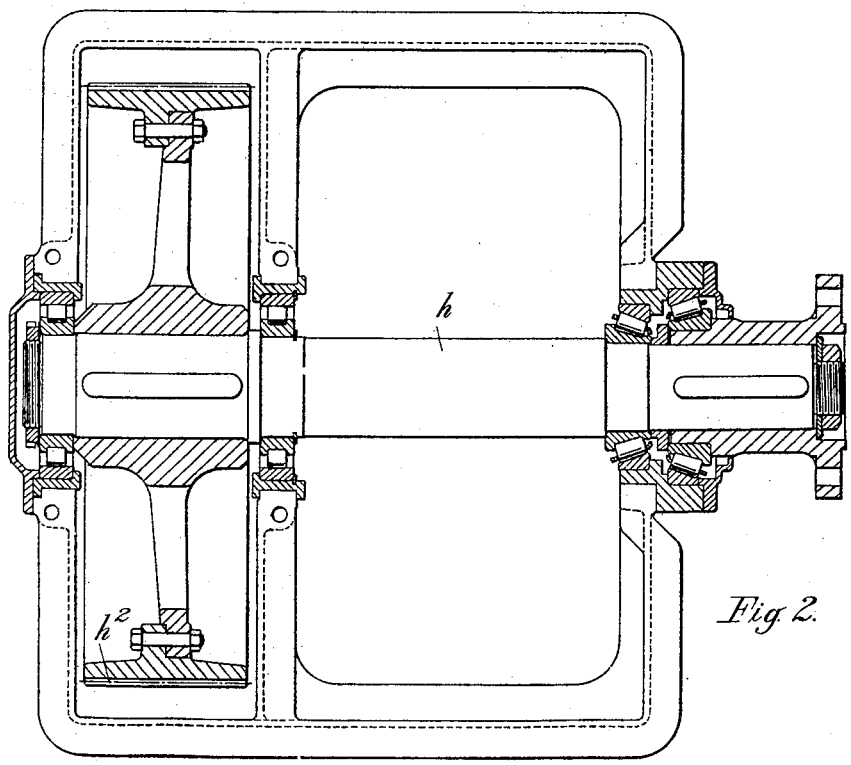

Further and more specific objects will be apparent from the following detailed description taken in connection with the accompanying drawings in which Figure 1 is a longitudinal view partly in section and partly in elevation of an embodiment of the invention; and Figure 2 is a view partly in section and partly in elevation taken in another plane and showing a portion of the reverse gear drive of the form embodied in Figure 1.

In connection with the drawings, as illustrated in Figures 1 and 2, the gearing arrangement is a compact structure including a housing or gear box $a$ in which are mounted a plurality of input shafts $b$. While four input shafts are shown in the drawing, it is of course understood that a single input shaft is operable. These input shafts are mounted in aligned pairs and extend within opposite sides of the housing and are engageable with a pair of driving shafts $d$ coaxial with and between the shafts of the respective pairs of input shafts. Fluid pressure operated clutches $c$ located respectively adjacent the opposite ends of each driving shaft are operable to control the transmission of power from the respective input shafts to the driving shafts. With respect to the particular embodiment illustrated, it is again obvious that only a single driving shaft and clutch associated therewith is operable. A pinion or gear $e$ is keyed to each driving shaft $d$ and these pinions mesh with a gear $f$ freely mounted upon a driven shaft $g$. This driven shaft $g$ has keyed thereon a pinion $h'$ meshing with a gear $h^2$ keyed to the output shaft $h$ as shown in Figure 2 and as indicated in Figure 1 disposed on a plane beneath the driven shaft $g$.

Associated with the gear $f$ and also freely mounted upon the driven shaft $g$ is a first bevel gear $f'$ meshing with two bevel pinions $f^2$ and $f^3$ mounted on diametrically opposite sides of driven shaft $g$ with their axes in alignment and at right angles to the axis of the driven shaft. These bevel pinions are carried in a supporting means which includes at least one fixed bracket mounted within the gear box. As indicated in the drawings, these supporting means journal the driving shafts $d$. The bevel pinions in turn mesh with a second bevel wheel $i$ hereinafter referred to as the reversing bevel wheel or gear which is also freely mounted on the driven shaft $g$.

Each of the bevel wheels $f'$ and $i$ and the aforementioned gear wheel $f$ (or wheels) has associated therewith, at least one pressure oil operated clutch, three clutches $k^1$, $k^2$ and $k^3$ being illustrated so that each bevel gear or wheel may when desired be coupled to the driven shaft and it will be understood that a suitable control cock or cocks $l'$, $l^2$, $l^3$ or other means will be provided for actuating the various clutches as required.

In connection with the particular fluid pressure or pressure oil operated clutch means disclosed, reference is made to my co-pending application Serial No. 598,992, filed June 12, 1945, disclosing in detail the particular clutch means utilized. As indicated in the drawing, the respective clutch means each include pairs of back to back plates splined to the associated shafts and movable thereon responsive to fluid pressure being introduced between the plates and clutch faces cooperable with the clutch plates forming a housing so that fluid under pressure can be introduced between the housing and the adjacent clutch plate to move them together for de-clutching. The particular control valves and the pump for forcing fluid under pressure into the clutches form no part of the present invention it being obvious that the pump or pumps can be .iven by one or more of the engines, not shown, driving the input shafts b. It is further clear that the various clutches are selectively operable to govern not only the direction of drive but in the instance shown where plural input shafts are employed the number of input shafts effective to transmit power to the driven shaft g. Thus, any one or more of the input shafts can be isolated when desired.

The arrangement is such that when the drive is required to be transmitted in the forward direction both the gear wheel f and bevel wheel f' associated therewith are coupled to the driven shaft g and the reversing bevel wheel i and bevel pinions $f^2$ and $f^3$ run free. With this arrangement it will be seen that the beforementioned clutches $k'k^3$ act in parallel and this is a desirable arrangement in cases where a greater power is required to be transmitted in one direction than in the other.

When it is required to transmit the power in reverse the beforementioned gear wheel f and bevel wheel f' associated therewith are allowed to run free and the reversing bevel wheel i is coupled to the driven shaft g so that the drive is thus given in reverse and in this case a single clutch $k^2$ transmits the drive not including one or other of the clutches c referred to below.

In the arrangement described in the preceding paragraphs the power transmitted in one direction of rotation differs from that transmitted in the other direction of rotation but in case of necessity and wherever convenient more than one pressure oil operated or the like clutch or coupling in series may be used or associated with both of the large bevel wheels.

The above described arrangement lends itself very conveniently to transmission gears in which a plurality of input shafts are associated with a common output shaft or vice versa; for example, in the particular construction illustrated as previously set forth I provide within the gear box or housing two driving shafts d as above described located on diametrically opposite sides of the driven or output shaft and each of the driving shafts may be associated with two input shafts in alignment therewith thus making four input shafts b in all, it being understood that each input shaft will be associated with an isolating clutch c (which may also be of the pressure oil operated or other type) so that in this way any one or more of the input shafts may be brought into operation as required.

I claim:

1. A reversing gear for transmissions including at least one driving shaft, a driven shaft, spaced bevel gears freely mounted on said driven shaft, at least one fixed bracket adjacent said driven shaft, at least one pinion mounted on said bracket and extending between and meshing with both said bevel gears, an additional gear fixed to one of said bevel gears and meshing with said driving shaft whereby both said bevel gears and said pinion continuously rotate responsive to rotation of the driving shaft, means for coupling said driven bevel gear to the driven shaft to rotate the same in one direction, means for coupling said other bevel gear to the driven shaft to rotate the same in the reverse direction whereby forward and reverse drive is effected through selective control of said coupling means and both said bevel gears and pinion constantly rotate regardless of the direction of drive.

2. A reversing gear comprising at least a plurality of input shafts, a plurality of driving shafts, a pressure fluid operated clutch means for selectively coupling said input shafts to said driving shafts, a pinion carried by each driving shaft, a shaft to be driven, a gear freely mounted upon said latter shaft and meshing with said pinions, pressure fluid operated clutch means for coupling said freely mounted gear to said driven shaft to effect drive in one direction, a bevel gear rotating with said last mentioned gear, at least one fixed bracket, at least one bevel pinion journalled in said bracket and meshing with said bevel gear, a second bevel gear meshing with said bevel pinion, both said bevel gears normally rotating freely with respect to said shaft to be driven and pressure fluid operated clutch means for clutching said second bevel gear to said driven shaft to effect a reverse direction of drive.

3. A reversing gear as defined in and by claim 2 in which a plurality of pressure fluid operated clutches are connected between said freely mounted gear and said shaft to be driven to effect the drive in said one direction.

4. A reversing gear as defined in and by claim 2 and including a housing, said input shaft comprising four input shafts journalled within said housing and extending in pairs from opposite ends thereof, and in which said driving shafts are two driving shafts journalled within the housing between and coaxial with the input shafts of each pair of input shafts, the pressure fluid operated clutch means for coupling the input shafts to each driving shaft constituting pairs of clutch means located respectively adjacent the opposite ends of each driving shaft, the said pinions being carried by the driving shafts between the clutch means associated therewith, said freely mounted gear and said first bevel pinion being joined together and rotatably mounted on said shaft to be driven, said clutch means for connecting said freely mounted gear to the shaft to be driven constituting a pair of axially aligned fluid operated clutches mounted in transverse alignment with the pinions carried by the driving shafts and operable when actuated to couple the driving shafts to the shaft to be driven for drive in one direction, and said bracket constituting part of supporting means extending transversely of the axes of all said shafts and from opposite sides of the housing and journalling said driving shafts, and a pair of axially aligned bevel pinions carried by said supporting means on diametrically opposite sides of said shaft to be driven with their axes extending transversely of the axes of all said other shafts.

THOMAS HINDMARCH.

REFERENCES CITED

The following references are of record in the file of this patent:

UNITED STATES PATENTS

| Number | Name | Date |
|---|---|---|
| 1,616,415 | Day | Feb. 1, 1927 |
| 1,667,842 | Coykendall | May 1, 1928 |
| 2,027,618 | Ronning | Jan. 14, 1936 |
| 2,155,434 | Marsh | Apr. 25, 1939 |
| 2,161,702 | Durig | June 6, 1939 |
| 2,247,967 | Shelmire | July 1, 1941 |
| 2,304,032 | Schmitter | Dec. 1, 1942 |

FOREIGN PATENTS

| Number | Country | Date |
|---|---|---|
| 183,373 | Switzerland | June 16, 1936 |